(12) United States Patent
Matsumoto

(10) Patent No.: US 8,285,155 B2
(45) Date of Patent: *Oct. 9, 2012

(54) OPTICAL RECEIVER FOR THE WDM SYSTEM AND METHOD TO CONTROL THE SAME

(75) Inventor: Kengo Matsumoto, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 333 days.

This patent is subject to a terminal disclaimer.

(21) Appl. No.: 12/631,329

(22) Filed: Dec. 4, 2009

(65) Prior Publication Data

US 2010/0142958 A1   Jun. 10, 2010

(30) Foreign Application Priority Data

Dec. 5, 2008   (JP) ................................. 2008-311252

(51) Int. Cl.
*H04B 10/06* (2006.01)
(52) U.S. Cl. ........ 398/209; 398/208; 398/210; 398/202; 398/79
(58) Field of Classification Search .................. 398/202, 398/79, 208–210, 93, 94
See application file for complete search history.

(56) References Cited

U.S. PATENT DOCUMENTS

| 5,745,276 | A  | * | 4/1998  | Ho et al. .................... 398/209 |
| 6,262,835 | B1 | * | 7/2001  | Kosaka et al. ............. 359/337.12 |
| 6,313,941 | B1 |   | 11/2001 | Suzuki et al. |
| 6,873,456 | B2 | * | 3/2005  | Motoshima et al. ..... 359/337.11 |
| 6,909,536 | B1 | * | 6/2005  | Walker et al. ................. 359/337 |
| 6,941,079 | B1 | * | 9/2005  | Barozzi et al. ................ 398/157 |
| 7,039,328 | B2 | * | 5/2006  | Oomori et al. ............... 398/202 |
| 7,092,638 | B2 | * | 8/2006  | Funami et al. ............... 398/158 |
| 7,362,498 | B1 | * | 4/2008  | Li et al. .................... 359/341.41 |
| 7,450,856 | B2 | * | 11/2008 | Yoshimoto et al. .......... 398/159 |
| 7,551,815 | B2 | * | 6/2009  | Welch et al. .................... 385/24 |
| 8,121,486 | B2 | * | 2/2012  | Uda et al. ........................ 398/97 |

(Continued)

FOREIGN PATENT DOCUMENTS

JP   2004-120669 A   4/2004

(Continued)

OTHER PUBLICATIONS

Cole, Chris and Tedros Tsegaye: "100GE 40 km SMF Technology Limitation," IEEE 802.3ba Task Force, Jan. 23-25, 2008 (http://www.ieee802.org/3/ba/public/jan08/cole_02_0108.pdf).

(Continued)

*Primary Examiner* — Kenneth N Vanderpuye
*Assistant Examiner* — Hibret Woldekidan
(74) *Attorney, Agent, or Firm* — Venable LLP; Michael A. Sartori; Christopher Ma

(57) ABSTRACT

An optical receiver with a simplified arrangement able to compensate the optical loss of the transmission medium is disclosed. The optical receiver of the invention includes an SOA in the front end thereof, an optical de-multiplexer, and a plurality of receiver modules that receives de-multiplexed light. The optical gain of the SOA is adjusted based on the electrical signals output from respective optical modules. When the receiver modules show the output thereof in a preset range, the bias current is kept unchanged, while, one receiver module shows the output out of the range, the bias current is incremented or decremented. When one receiver module shows the output out of the absolute maximum/minimum, the bias current is forced to the initial value.

14 Claims, 9 Drawing Sheets

U.S. PATENT DOCUMENTS

| | | | |
|---|---|---|---|
| 2002/0043617 A1* | 4/2002 | Losch | 250/226 |
| 2003/0202805 A1* | 10/2003 | Taga et al. | 398/202 |
| 2004/0062557 A1* | 4/2004 | Takashima et al. | 398/209 |
| 2004/0208569 A1 | 10/2004 | Nabeyama et al. | |
| 2005/0018732 A1* | 1/2005 | Bond et al. | 372/50 |
| 2007/0183738 A1* | 8/2007 | Welch et al. | 385/147 |
| 2008/0174856 A1 | 7/2008 | Matsuda et al. | |
| 2008/0212982 A1* | 9/2008 | Sato et al. | 398/208 |
| 2009/0129785 A1* | 5/2009 | Murakami | 398/160 |
| 2010/0098422 A1* | 4/2010 | Takeda | 398/79 |
| 2010/0142958 A1 | 6/2010 | Matsumoto | |
| 2010/0239263 A1* | 9/2010 | Tokura et al. | 398/94 |
| 2011/0182591 A1* | 7/2011 | Ikeuchi et al. | 398/208 |
| 2011/0243576 A1* | 10/2011 | Oomori | 398/208 |

FOREIGN PATENT DOCUMENTS

JP     2005-064051 A     3/2005

OTHER PUBLICATIONS

Matsumoto, Kengo: "WDM Alternatives for 100GE 40km SMF application," Nov. 2007 (http://ieee802.org/3/hssg/public/nov07/matsumoto_01_1107.pdf).

Gutierrez-Castrejon, Ramon: "Analysis of 4×25-Gb/s 40-km 1310-nm PMD with SOA Pre-Amplifier PMD," IEEE HSSG Meeting Atlanta, Nov. 2007 (http://www.ieee802.orq/3/hssg/public/nov07/gutierrez_01_1107.pdf).

Gutierrez-Castrejon, Ramon: "Using SOAs as Booster and/or Pre-Amplifier for 4×25-Gb/s 40-km 1310-nm, PMD" IEEE HSSG Meeting Atlanta Nov. 2007 (http://www.ieee802.org.3/hssg/public/nov07/gutierrez_02_1107.pdf).

Gutierrez-Castrejon, Ramon: "4×25 Gb/s 40-km 1310-nm PMD with SOA Pre-Amplifier: Impact of Channel Spacing," IEEE HSSG Meeting, Atlanta, Nov. 2007 (http://www.ieee802.org/3/hssg/public/nov07/gutierrez_03_1107.pdf).

* cited by examiner

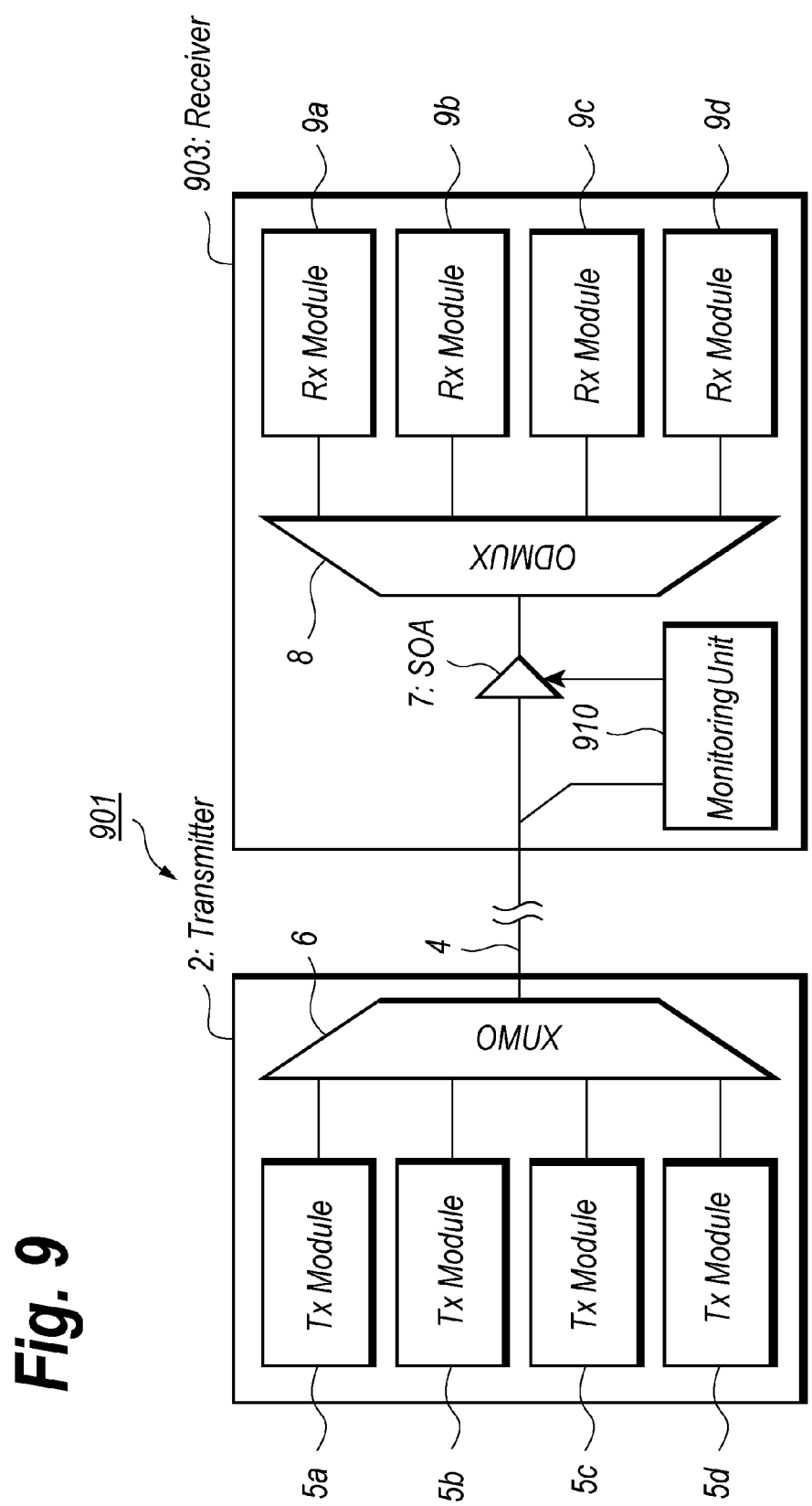

OPTICAL RECEIVER FOR THE WDM SYSTEM AND METHOD TO CONTROL THE SAME

BACKGROUND OF THE INVENTION

1. Field of the Invention

The present invention relates to an optical receiver applied to the wavelength division multiplexing (WDM) system and a method to control the optical receiver.

2. Related Prior Art

Recent optical communication system sometimes requests the transmission speed thereof reaching 100 Gbps to solve the bottleneck of the transmission capacity between the servers. One solution for the request has been proposed, in which the system includes an optical transmitter transmits signal light containing four optical signals each emitted from, for instance, an electro-absorption modulated laser (EML) or a direct modulated laser (DML), modulated at about 26 Gbps and multiplexed by an wavelength division multiplexer; a single mode fiber (SMF) with a length of 10 to 40 km to transmit the signal light; and an optical receiver including four receiver modules each receiving optical signals de-multiplexed by an optical de-multiplexer. This system may realize an equivalent transmission capacity of about 100 Gbps.

In such a communication system, because of the large optical loss in the SMF with the 40 km length, the optical receiver has been used to accompany with a semiconductor optical amplifier (hereafter denoted as SOA) in the upstream side of the optical de-multiplexer to compensate the optical loss in the SMF. One technique has been reported to compensate the optical loss dynamically, in which the bias current supplied to the SOA is dynamically adjusted to vary the optical gain of the amplifier based on the input level to the SOA. When the optical input level reduces, the optical receiver increases the bias current to increase the optical gain. While, the receiver decreases the bias current to lower the optical gain of the SOA when the optical input level increases, or flows the bias current in the opposite direction to operate the SOA as a device to absorb light, that is, an optical attenuator.

Another method to prevent the receiver module connected in the downstream side of the optical de-multiplexer from receiving an excessive optical signal has been proposed in a Japanese Patent application published as JP-2004-120669A. The optical receiver disclosed therein provides an optical attenuator in the front end to adjust the optical output level from the SOA. Another arrangement has been disclosed in a Japanese Patent published as JP-2005-064051A where the optical receiver has a function combining the front end attenuator and the variable gain optical amplifier.

In such conventional optical receivers, the optical receiver monitors the optical input level at the upstream side of the SOA, and the bias current supplied to the SOA is so adjusted based on the monitored result, which is inevitable to provide additional optical components such as, for instance, an optical splitter and an optical attenuator, which makes the optical receiver complicated and large-size. The present invention is to provide an optical receiver with a simplified arrangement and a function to prevent the receiver modules from receiving an excessive optical input.

SUMMARY OF THE INVENTION

One aspect of the present invention relates to a method to control an optical receiver that includes an SOA, an optical de-multiplexer and a plurality of optical receiver modules. The SOA is installed in a front end of the optical receiver. Each of the optical receiver modules receives one of de-multiplexed optical signals. The method includes steps of: (a) monitoring electrical signals output from respective optical receiver modules, (b) comparing the electrical signals with preset references, and (c) controlling the bias current supplied to the SOA to adjust the optical gain of the SOA.

According to the method of the present invention, because the optical receiver monitors the electrical signals output from the respective optical receiver modules and reflects the monitored results in the bias current provided to the SOA, not only the control of the optical gain of the SOA which is equivalent to the optical input level to respective optical receiver modules may become stable but the optical receiver may have a compact arrangement.

Specifically illustrating the method to control the optical receiver; (1) the bias current is left unchanged when all electrical signals output from the optical receiver modules are within a range between the upper and lower control limits; (2) the bias current is incremented when at least one of the electrical signals output from the optical receiver modules is less than the lower control limit but all of the electrical signals is less than an absolute maximum or decremented when at least one of electrical signals output from respective optical receiver modules is greater than the upper control limit but all of the electrical signals is greater than an absolute minimum; or (3) the bias current is set to an initial current when at least one of the electrical signals output from respective optical receiver modules is less than the absolute minimum or greater than the absolute maximum. The optical receiver may assert an alarm to the outside thereof concurrently with the set of the bias current in the initial current. Moreover, the width of the range between the upper and lower control limits is preferably about 10 dB.

Another aspect of the present invention relates to an optical receiver installed in the WDM communication system. The optical receiver comprises an SOA installed in the front end of the optical receiver, an optical de-multiplexer, and a plurality of receiver optical modules. The SOA receives signal light containing a plurality of optical signals each having specific wavelengths different from each others. The optical de-multiplexer de-multiplexes the signal light into a plurality of optical signals. Each of the optical receiver modules receives one of the optical signals de-multiplexed by the optical de-multiplexer and converts the one of optical signals into an electrical signal. In the present invention, the SOA varies an optical gain thereof by adjusting a bias current supplied to the SOA depending on the electrical signals output form the optical receiver modules.

The optical receiver may further comprise an arithmetic unit, a memory and an interface. The arithmetic unit (1) leaves the bias current unchanged when the electrical signals output form the optical receiver modules are in a range between the upper and lower control limits; (2) increments the bias current by a preset step when at least one of the electrical signals is less than the lower control limit but all of the electrical outputs is less than the absolute maximum, or decrements the bias current when at least one of the electrical signals is greater than the upper control limit but all of the electrical signals is greater than the absolute minimum; or (3) sets the bias current to the initial current when at least one of the electrical signals is greater than the absolute maximum or less than the absolute minimum.

The optical receiver of the present invention is so configured that the outputs of respective optical receiver modules are electrically monitored and electrically compared with references, and the bias current is adjusted by the monitored results; accordingly, the optical receiver may have the stable control of the optical input level to respective optical receiver modules and may compact the size thereof.

BRIEF DESCRIPTION OF DRAWINGS

The foregoing and other purposes, aspects and advantages will be better understood from the following detailed description of a preferred embodiment of the invention with reference to the drawings, in which:

FIG. 9 shows a block diagram of the WDM communication system that includes a conventional optical receiver.

DESCRIPTION OF PREFERRED EMBODIMENTS

Next, preferred embodiments according to the present invention will be described in detail as referring to accompanying drawings. In the description of the drawings, the same numerals and symbols will refer to the same elements without overlapping explanations.

Figure 1:
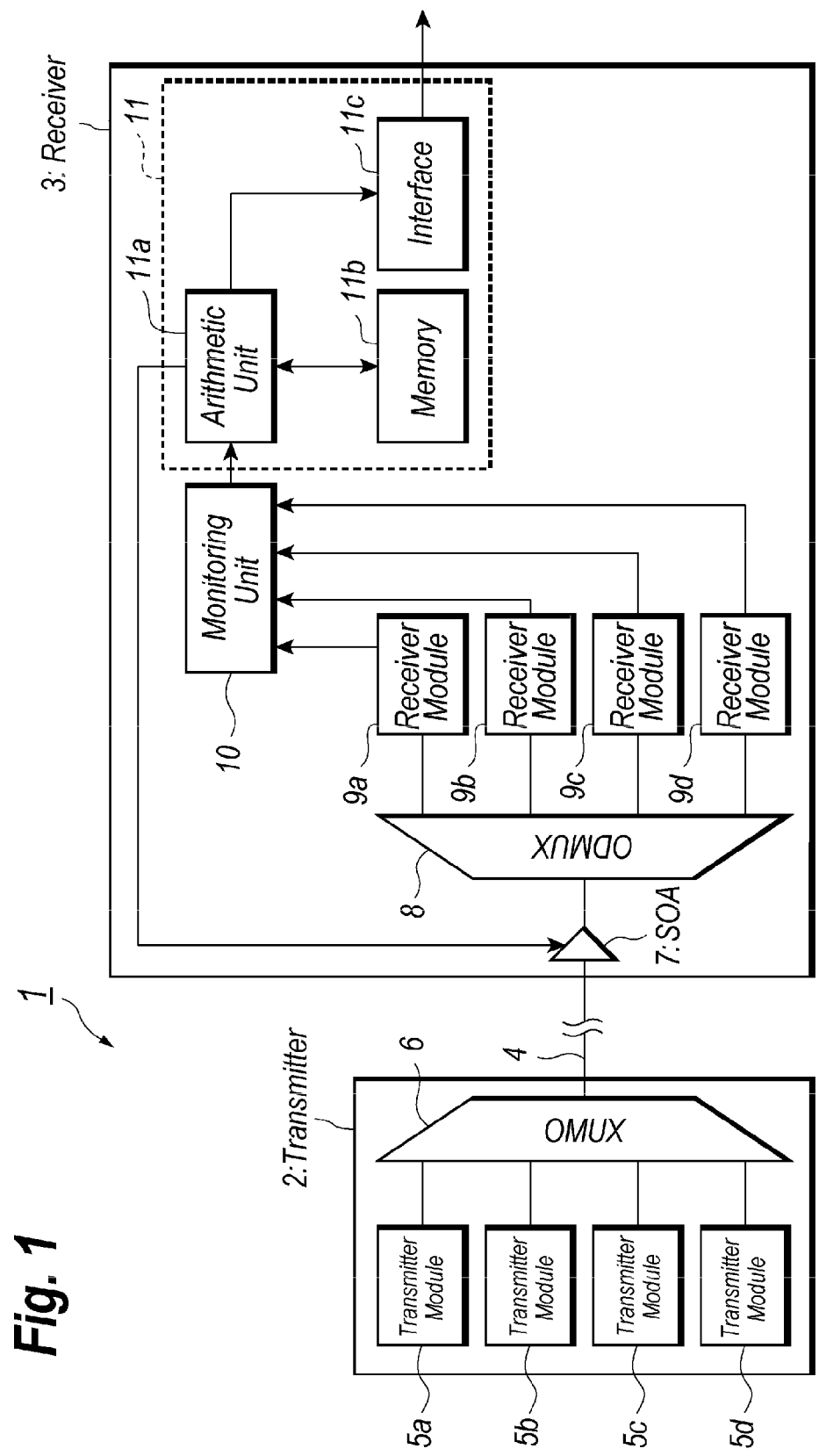
FIG. 1 a block diagram of the optical communication system including an optical receiver that receives signal light multiplexed with four optical signals.

FIG. 1 illustrates a block diagram of an optical communication system according to an embodiment of the present invention, which installs an optical receiver with a function of the four wavelengths multiplexing. The optical communication system 1 shown in FIG. 1 comprises the optical transmitter 2 with the function of the four wavelengths multiplexing, the optical receiver 3 with the function of the four wavelengths de-multiplexing, and an optical medium 4 made of a single mode fiber (SMF) provided between the optical transmitter 2 and the optical receiver 3.

The optical transmitter 2 outputs multiplexed signal light to the optical medium 4. The multiplexed signal light includes four distinct optical signals each modulated at about 26 Gbps by respective optical transmitter modules, 5a to 5d, and multiplexed by the optical multiplexer (hereafter denoted as OMUX) 6; accordingly, the multiplexed optical signal has the equivalent modulation speed of about 100 Gbps. The wavelengths of the distinct optical signals may be, for instance, 1295 nm, 1300 nm, 1304 nm, and 1309 nm, respectively.

While, the optical receiver 3 receives through the transmission medium 4 the multiplexed light which contains four distinguished optical signals. The optical receiver 3 comprises a semiconductor optical amplifier 7 (hereafter denoted as SOA) in the front end thereof, an optical de-multiplexer 8 (hereafter denoted as ODMUX), four optical receiver modules, 9a to 9d, a monitoring unit 10, and a control unit 11.

The SOA 7 amplifies the multiplexed signal light provided from the transmission medium 4 and outputs the amplified signal light to the ODMUX 8. The SOA 7 may be adjusted in the optical gain thereof depending on the bias current provided from the control unit 11.

The ODMUX 8 de-multiplexes the multiplexed optical signal, which is amplified by the SOA 7, into four optical signals depending on the wavelengths thereof. Respective de-multiplexed optical signals are modulated at about 26 Gbps by the optical transmitter 2. The ODMUX 8 outputs thus de-multiplexed optical signals to respective optical receiver modules, 9a to 9d.

The optical receiver modules, 9a to 9d, convert the de-multiplexed optical signal output from the ODMUX 8 into electrical signals. The optical receiver modules, 9a to 9d, each accompanies with a receiver circuit in the downstream thereof which may carryout various processes for the electrical signal, for instance, the downstream circuit may carry out the clock recovery, the data recovery and the re-timing of the clock and data. FIG. 1 omits these downstream circuits. The optical receiver modules, 9a to 9d, may also output the electrical signal to the monitoring unit 10.

The monitoring unit 10 monitors the outputs of respective optical receiver modules, 9a to 9d, to generate a control signal that reflects the monitoring results to the control unit 11. The control unit 11, by receiving the control signal from the monitoring unit 10, adjusts the bias current providing to the SOA 7.

Figure 2:
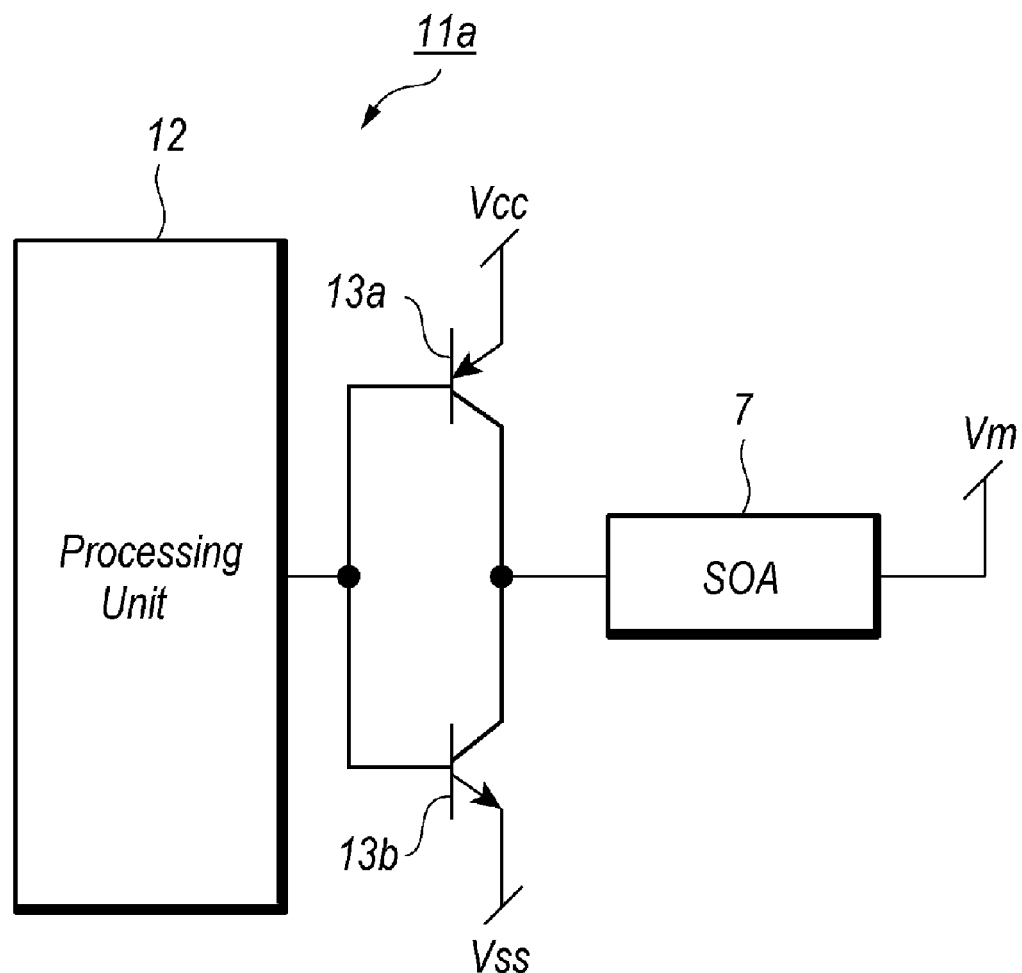
FIG. 2 is a block diagram of the arithmetic unit in the optical receiver shown in FIG. 1.

Specifically, the control unit 11 comprises an arithmetic unit 11a, a memory 11b, and an interface 11c. The memory 11b stores various parameters and algorithms necessary to control the bias current, while, the arithmetic unit 11a performs the control of the bias current by fetching the parameters and the algorithms from the memory 11b. FIG. 2 illustrates an example of the arithmetic unit 11a, where the unit 11a comprises the processing unit 12 and two transistors, 13a and 13b, which are connected in series and operate as a current source whose currents are controlled by the processing unit 12. Between two transistors, 13a and 13b, is connected to one terminal of the SOA 7, while the other terminal of the SOA 7 is provided with a reference potential Vm. Thus, the processing unit 12 may control the bias current supplied to the SOA 7 through two transistors, 13a and 13b.

Referring again to FIG. 1, the interface 11c in the control unit 11 outputs an alarm to the outside of the receiver 3 when the monitoring unit 10 detects any abnormal state in the outputs of the receiver modules, 9a to 9d. Specifically, the memory 11b stores the upper control limit $V_{cmax}$, the lower control limit $V_{cmin}$, the absolute maximum $V_{max}$, and the absolute minimum $V_{min}$ in advance to the practical operation of the control unit 11. The arithmetic unit 11a adjusts the bias current for the SOA 7 such that the any of the output of the receiver modules, 9a to 9c, are set within a range between the upper control limit $V_{cmax}$ and the lower control limit $V_{cmin}$. When one of the outputs of the receiver modules, 9a to 9d, exceeds the absolute maximum $V_{max}$ or lowers the absolute minimum $V_{min}$, the control unit 11 outputs the alarm to the outside and ceases the bias current to be supplied to the SOA 7. A detail of the control for the bias current will be described later.

In addition to the parameters mentioned above, the memory 11b further stores, as the current controlling parameters, the initial bias current $I_{b0}$, the minimum current $I_{bmin}$, the maximum current $I_{bmax}$, and the control width $\Delta I_b$. The arithmetic unit 11a iterates to increase or to decrease the bias current $I_b$ by the control width $\Delta I_b$ within the range between the maximum current $I_{bmax}$ and the minimum current $I_{bmin}$. While, the arithmetic unit 11a refers to the initial bias current $I_{b0}$ at the initializing of the optical receiver 3 or forcibly sets the bias current $I_b$ to the initial current $I_{b0}$ when the optical receiver modules, 9a to 9d, detect an anomaly in the output thereof.

Figure 3:
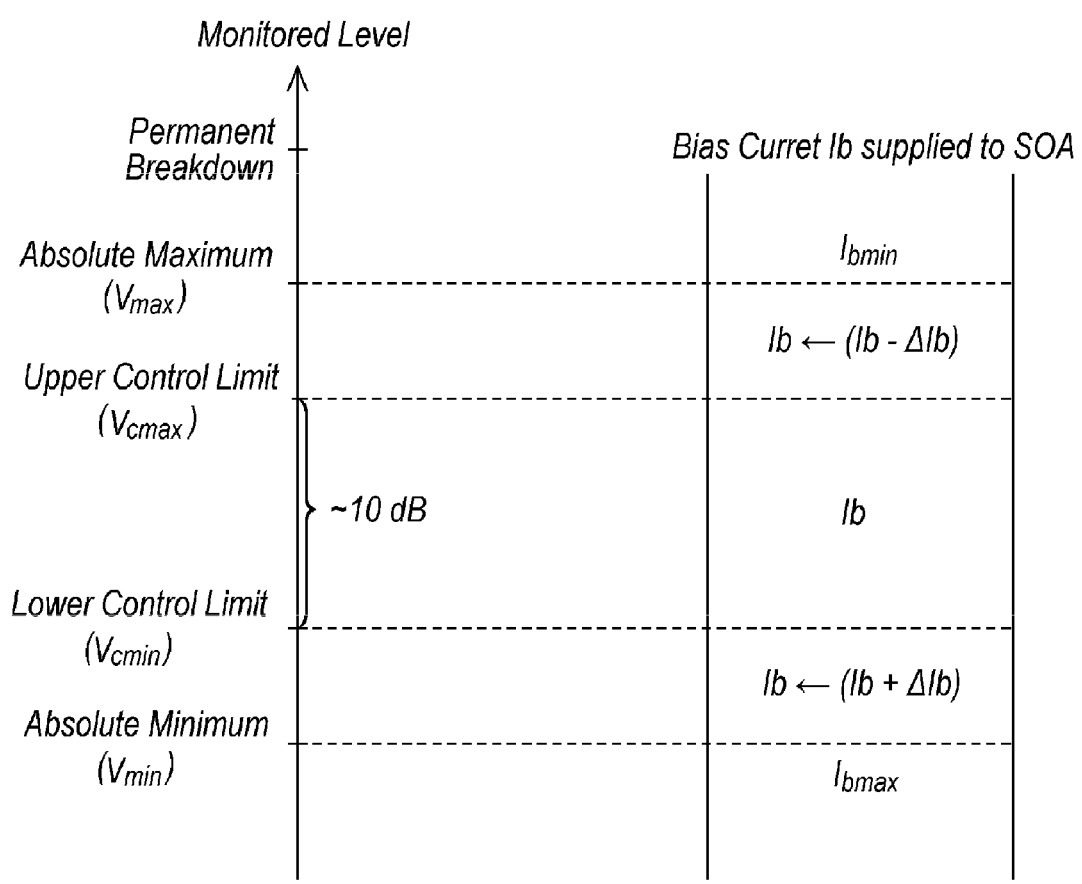
FIG. 3 schematically illustrates a relation between the monitored level of the receiver module and the bias current supplied to the SOA.

FIG. 3 schematically shows an operation carried out in the arithmetic unit 11a. When all monitored levels provided from the receiver modules, 9a to 9d, are between the upper control limit $V_{cmax}$ and the lower control limit $V_{cmin}$, a width which may be preferably set to be about 10 dB, the bias current $I_b$ presently provided to the SOA 7 is maintained. When at least one of the optical receiver modules, 9a to 9d, outputs an anomaly exceeding the upper control limit $V_{cmax}$, the arithmetic unit 11a decreases the bias current $I_b$ by the control width $\Delta I_b$ from the presently supplied magnitude. While, when at least one of the optical receiver modules, 9a to 9b, shows the output thereof less than the lower control limit $V_{cmin}$, the bias current $I_b$ provided to the SOA 7 is adjusted so as to increase by the control width $\Delta I_b$. When one of the outputs of the optical receiver modules, 9a to 9d, exceeds the absolute maximum $V_{max}$ or fall below the absolute minimum $V_{min}$, the bias current $I_b$ is forced to be the initial bias current $I_{b0}$.

The dynamic range of the optical input level, where the optical receiver may recover the high speed optical signal without substantial errors, may be determined based on the intrinsic characteristic of the optical receiver modules, 9a to 9d, without providing the SOA 7. Typical maximum input level is about +2 dBm, while, typical minimum level is about −12 dBm, which corresponds to the optical dynamic range of 14 dB. Setting the SOA 7 in the upstream side of the optical receiver modules, 9a to 9d, to amplify the input optical signal and adjusting the bias current of the SOA 7, the optical dynamic range of the receiver 3 may be further expanded.

The SOA 7 generally accompanies with optical noise, which is a type of the white noise called as the amplified spontaneous emission (ASE), when it amplifies the optical signal. Accordingly, the optical receiver 3 providing the SOA 7 in the front end thereof is necessary to consider the ratio of the optical signal to the optical noise (hereafter called as OSNR: Optical Signal to Noise Ratio). Specifically, an optical system is necessary to be designed so as to install an SOA with lesser noise including but not restricted to the ASE and to enlarge the optical dynamic range of the SOA as possible. Such an optical system would show a higher OSNR and be able to receive the high speed signal without substantial receiving errors. On the other hand, when the optical level output from the SOA, which is led to respective optical receiver modules, 9a to 9d, becomes excessively large, one type of the optical distortion called as the four waves mixing (FWM) is induced in the SOA 7. Accordingly, an optical output level of the SOA 7 is necessary to be optimal. The bias current $I_b$ supplied to the SOA 7 and parameters determining the magnitude of the bias current $I_b$ must reflect these characteristics contrary to each other.

Figure 4:
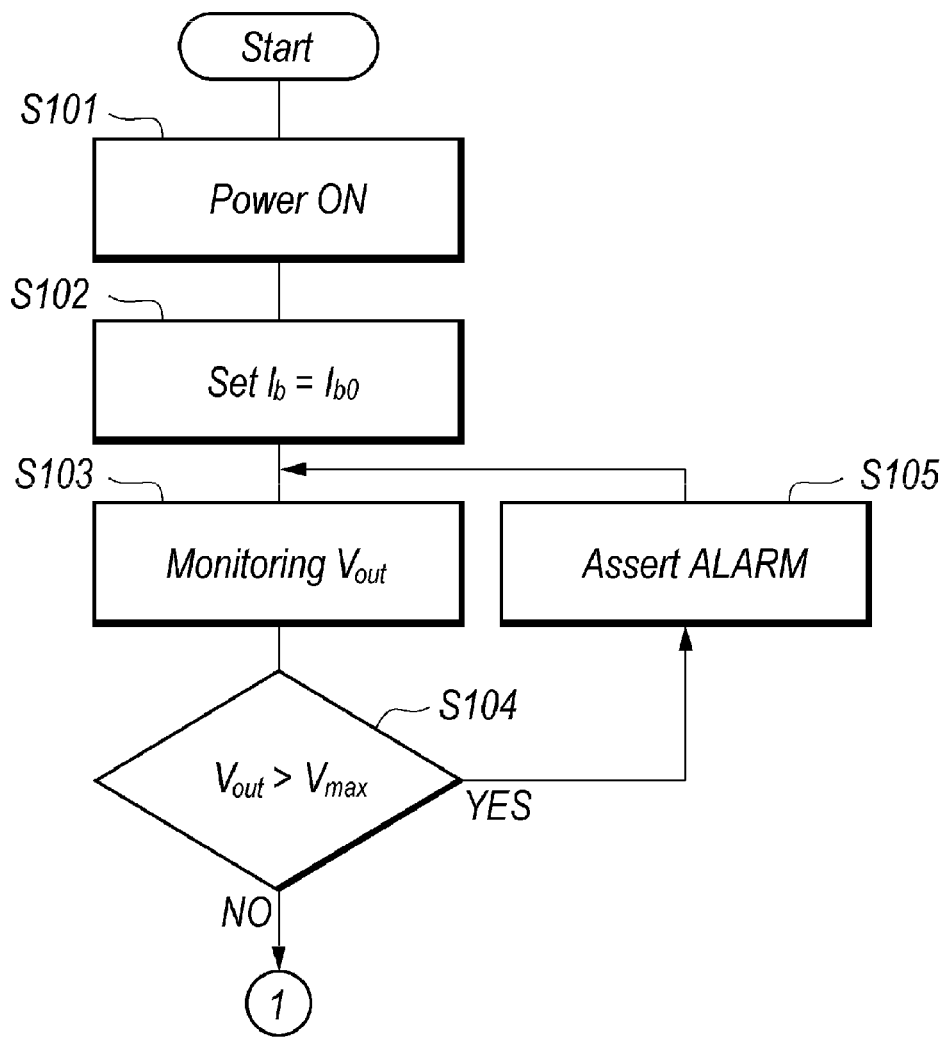
FIG. 4 is a flow chart to start up the optical receiver.
Figure 5:
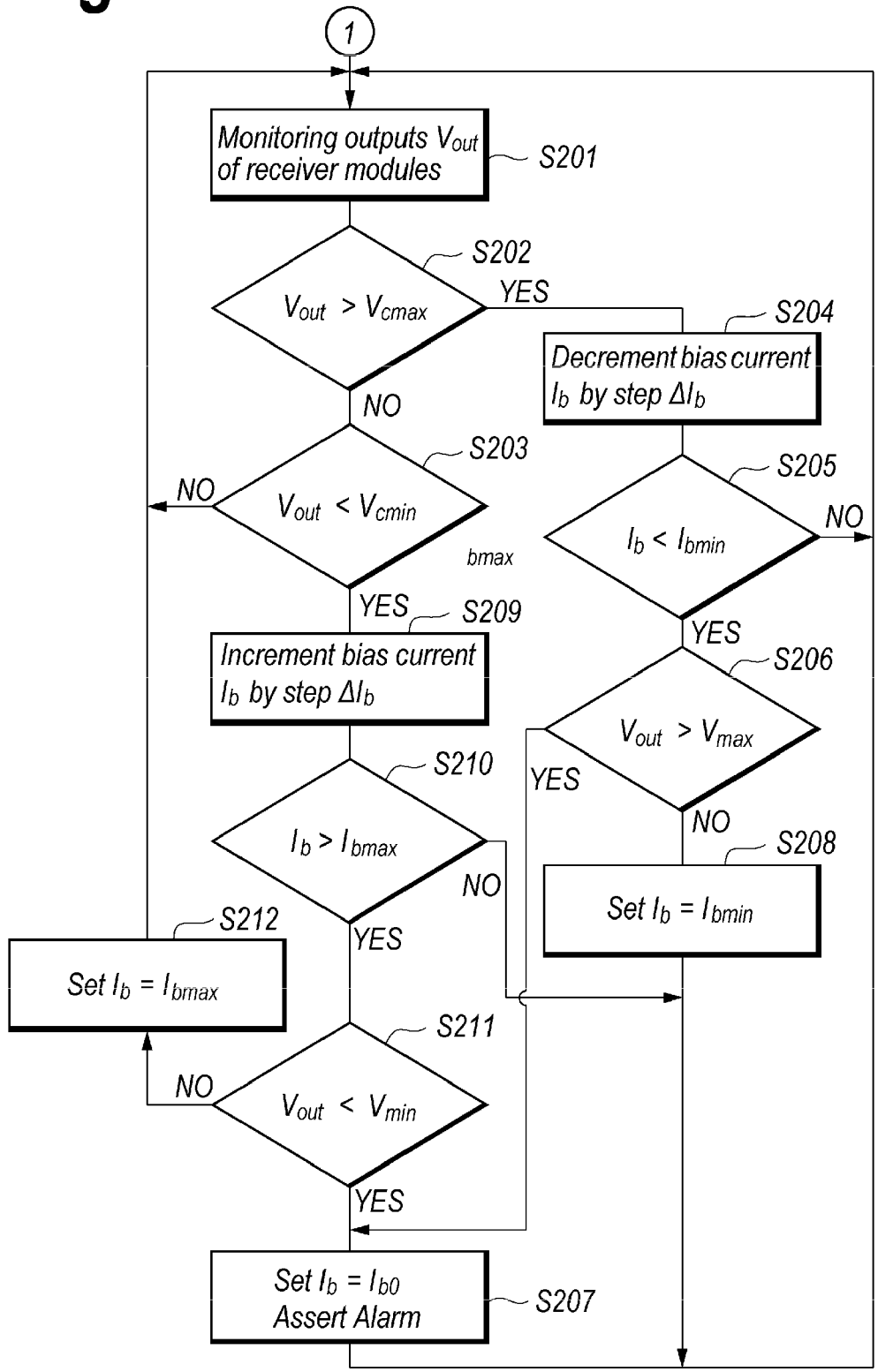
FIG. 5 is a flow char to control the optical receiver under the normal operation.

Next, an operation and a method to control the optical receiver 3 will be described as referring to FIGS. 4 and 5. FIG. 4 is a flow chart when the optical receiver 3 is powered on, while, FIG. 5 is a flow chart showing the gain control of the SOA 7 after the optical receiver 3 is powered on.

First, the initial operation of the optical receiver 3 after the optical receiver 3 is powered on will be described at step S101 of FIG. 4. The control unit 11 sets the bias current $I_b$ supplied to the SOA 7 to be the initial bias current $I_{b0}$ to restrict the rush input to respective receiver modules, 9a to 9d, at step S102. Subsequently, the monitoring unit 10 monitors the outputs of the receiver modules, 9a to 9d, and outputs the monitored electrical signal to the control unit 11 at step S103. The arithmetic unit 11a in the control unit 11 decides whether at least one of the monitored electrical signals $V_{out}$ exceeds the absolute maximum $V_{max}$ or not. When one of the monitored electrical signals $V_{out}$ is over the absolute maximum $V_{max}$, which is the branch "YES" at step S104, the control unit 11 asserts the alarm through the interface 11c and fixes the bias current $I_b$ to the initial current $I_{b0}$ at step 105.

The initial bias current $I_{b0}$ is to prevent respective receiver modules, 9a to 9d, from causing failure by the excess optical input and to suppress the FWM distortion. When the receiver 3 is powered on under the condition where the SOA 7 keeps the optical gain in substantially high, the receiver modules, 9a to 9d, possibly receive an excessive input. The control unit 11 controls the bias current $I_b$ so as to reduce the optical gain of the SOA 7 below unity at the starting up of the receiver 3. The absolute maximum $V_{max}$ may be a threshold to assert an alarm corresponding to the optical input under which respective receiver modules, 9a to 9d, is not broken. Specifically, the absolute maximum $V_{max}$ is often set in a value which the OSNR described above exceeds an error rate of $10^{-5}$ under a condition that the bias current $I_b$ is set in the initial current $I_{b0}$. When all outputs of the receiver modules, 9a to 9d, are less than the absolute maximum $V_{max}$, which corresponds to the branch "NO" at step S104, the control flow shown in FIG. 4 shifts to the normal sequence shown in FIG. 5.

Figure 6:
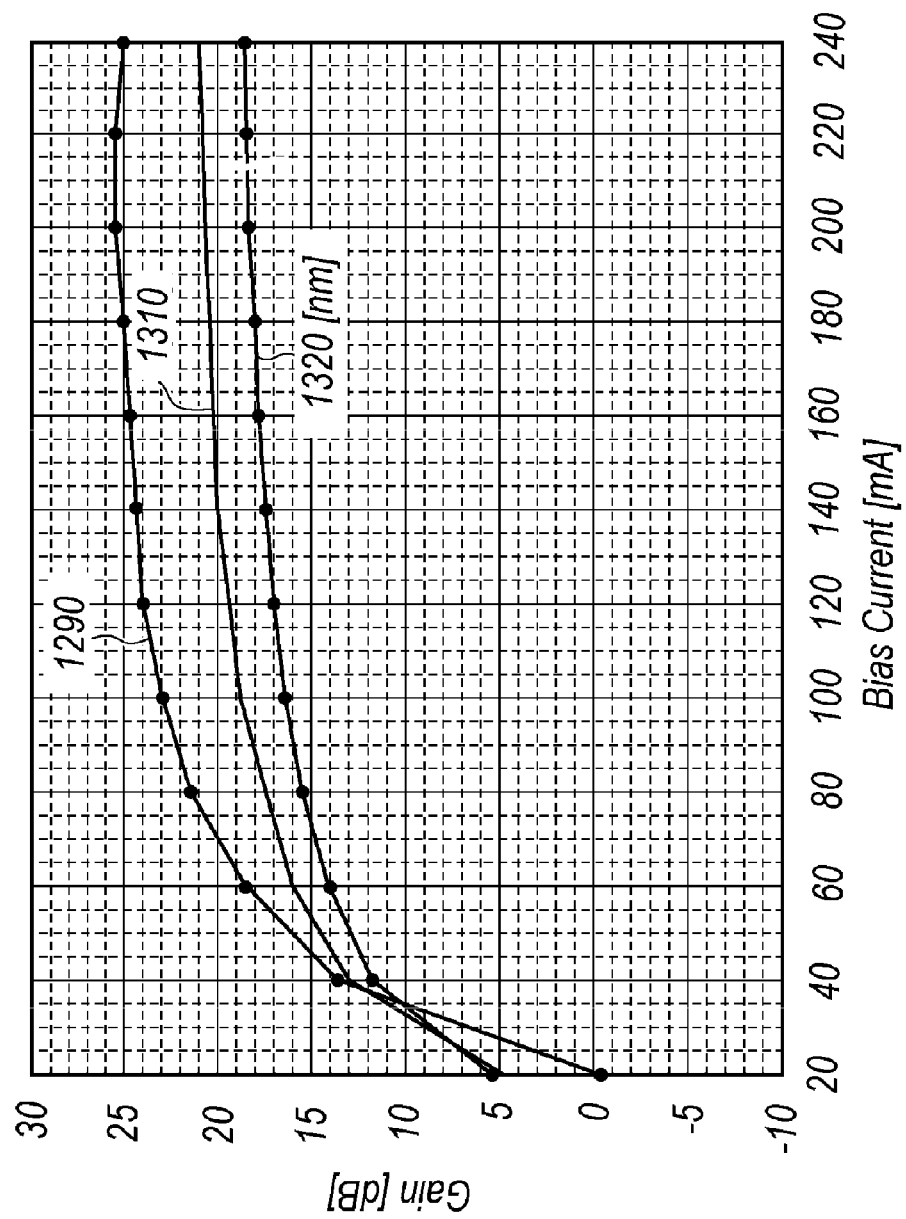
FIG. 6 illustrates the optical gain of the SOA fore various wavelengths against the bias current supplied thereto.

The SOA 7 changes the optical gain depending on the bias current $I_b$ supplied thereto, however, the optical gain generally depends on the wavelength, as illustrated in FIG. 6. Assuming the wavelengths of the optical signal input to the receiver modules, 9a to 9d, are 1290 to 1320 nm, the optical gain of the SOA 7 varies from 0 dB to 25 dB depending on the bias current of 20 mA to 120 mA. The optical gain of the SOA 7 also shows dependence on the polarization of the light input thereto; however, the dependence on the polarization is generally small compared to that on the bias current $I_b$. In particular, in a range the bias current is relatively small, where the optical gain of the SOA 7 strongly depends on the magnitude of the bias current, the polarization dependence may be ignored. For instance, the optical gain for the light with the wavelength of 1320 nm is larger by about 7 dB than that for the light with the wavelength of 1290 nm under the bias current of 20 mA, while, the optical gain for the light with the wavelength of 1290 nm exceeds by about 9 dB compared to the light with the wavelength of 1320 nm at the bias current $I_b$ of 120 mA.

Thus, the upper control limit $V_{cmax}$ and the lower control limit $V_{cmin}$ are set beforehand so as to reflect the dependence of the optical gain on the bias current and, sometimes, the dependence of the gain on the polarization. The range between the upper control limit $V_{cmax}$ and the lower control limit $V_{cmin}$ may be set based on the dependence of the optical gain on the bias current, and a specific example shown in FIG. 6 may be set about 10 dB. The center between both control limits, $V_{cmax}$ and $V_{cmin}$, is selected such that the outputs of respective receiver modules, 9a to 9d, show the error rate far smaller than a limit necessary for the transmission system, which is for instance $10^{-12}$.

In the normal sequence, the monitoring unit 10 monitors the outputs $V_{out}$ of the respective receiver modules, 9a to 9d, at step S201, and the arithmetic unit 11a in the control unit 11 decides whether the output $V_{out}$ of the monitoring unit 10 exceeds the upper control limit $V_{cmax}$ or not at step S202. When at least one of the receiver modules, 9a to 9d, shows the output thereof exceeding the upper control limit $V_{cmax}$, the arithmetic unit 11a decreases the bias current $I_b$ by the control step $\Delta I_b$ at step S204. The arithmetic unit 11a further checks whether thus decremented bias current $I_b$ is smaller than the minimum current $I_{bmin}$. The control sequence returns step S201 to check other outputs $V_{out}$ of the receiver modules, 11a to 11d, when the bias current Ib is greater than the minimum current $I_{bmin}$, which corresponds to branch "NO" at step S205. On the other hand, when the decremented current lowers the minimum current $I_{bmin}$, the arithmetic unit 11a checks whether at least one of the outputs $V_{out}$ of the receiver modules, 9a to 9d, exceeds the absolute maximum $V_{max}$ or not, at step S206. All of the receiver modules, 9a to 9d, show the output thereof less than the upper control limit $V_{cmax}$, which corresponds to the branch "NO", the arithmetic unit 11a sets the bias current to the minimum current $I_{bmin}$ at step S208 and the control sequence returns step S201. While, when at least one of the receiver modules, 9a to 9d, shows the output thereof exceeding the absolute maximum $V_{max}$, which corresponds to the branch "YES" at step S206, the arithmetic unit 11a asserts the alarm to the outside of the receiver 3, sets the bias current $I_b$ to the initial current $I_{b0}$ at step S207; and the sequence returns step S201.

Figure 7:
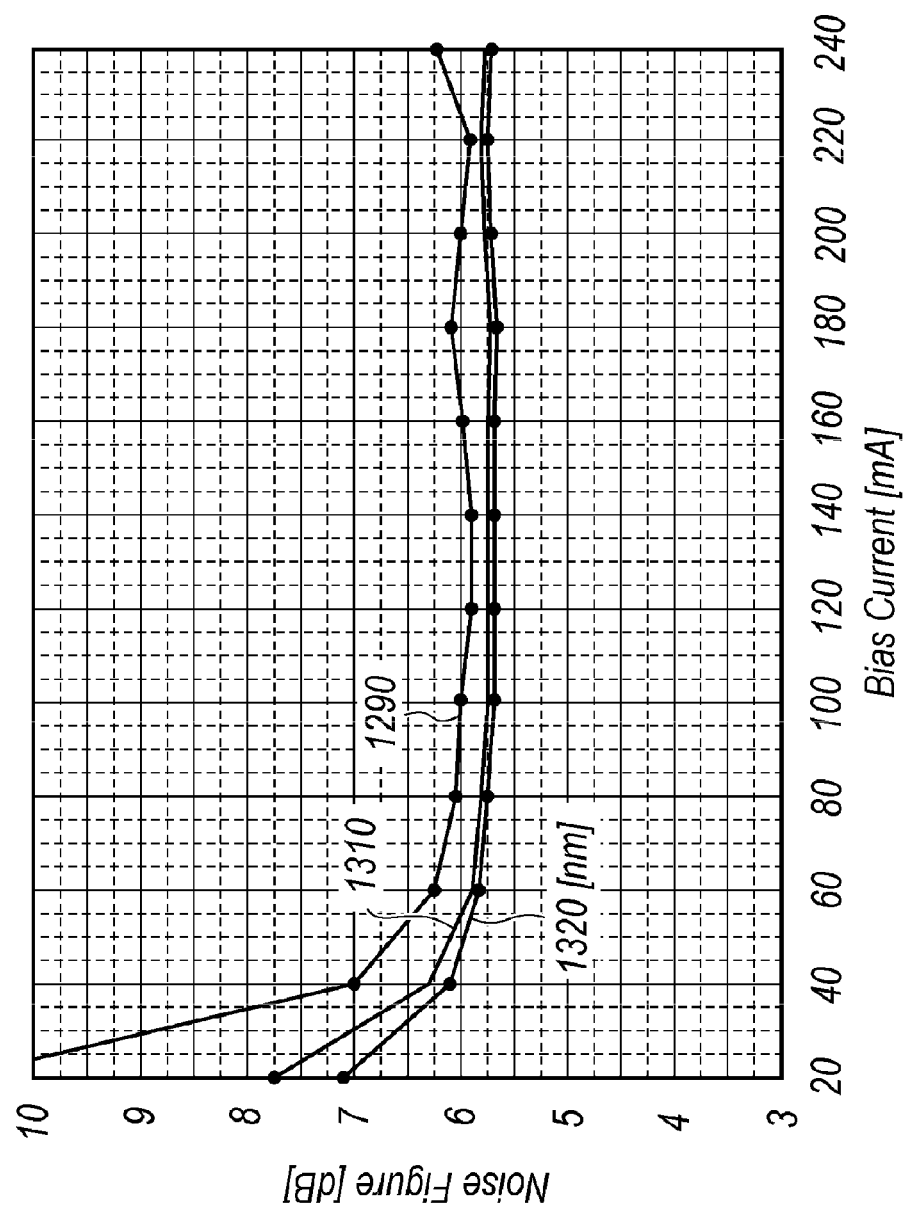
FIG. 7 shows the noise figure (NF) of the SOA for various wavelengths against the bias current.

Thus, when the optical input level increases under the normal operating condition for the SOA 7, the arithmetic unit 11a adjusts the bias current $I_b$ so as to set all outputs of the receiver modules, 9a to 9d, less than the upper control limit $V_{cmax}$. The reason why the arithmetic unit 11a sets the bias current $I_b$ so as not to be less than the minimum bias current $I_{bmin}$ is to suppress the degradation of the noise figure NF. FIG. 7 shows a typical noise figure NF against the bias current $I_b$ and the wavelength. In a range where the bias current is suppressed, the NF drastically degrades, that is, the magnitude thereof increases. Under the condition where the substantial bias current is supplied to the SOA 7, the output thereof rises as the optical input of the receiver 3 increases, and one receiver module outputs a monitored value greater than the absolute maximum $V_{max}$. Then, the control unit 11 asserts the alarm to the outside of the receiver 3.

When the sequence decides at step S202 that all receiver modules 9a to 9d, show the outputs less than the upper control limit $V_{cmax}$, which corresponds to branch "NO", the arithmetic unit 11a further checks whether the receiver modules shows the output thereof less than the lower control limit $V_{cmin}$ at step S203. When all receiver modules, 9a to 9d, show the outputs $V_{out}$ thereof greater than the lower control limit $V_{cmin}$, which is the branch "NO" at step S203, the arithmetic unit 11a performs no operation for the bias current $I_b$ and the sequence returns step S201.

On the other hand, when at least one receiver module shows the output thereof less than the lower control limit $V_{cmin}$, which is the branch "YES" at step S203, the arithmetic unit 11a increments the bias current $I_b$ by $\Delta I_b$ at step S209. The arithmetic unit 11a further checks whether the incremented bias current exceeds the maximum bias current $I_{bmax}$ or not at step S210. When the incremented bias current is still less than the maximum current $I_{bmax}$, which is the branch "NO" at step S210, the sequence returns step S201 and iterates the monitoring of the outputs of respective receiver modules, 9a to 9d. While, the incremented bias current exceeds the maximum current $I_{bmax}$, which is the branch "YES" at step S210, the arithmetic unit checks at step S211 whether one receiver module, 9a to 9d, shows the output thereof less than the absolute minimum or not. When all receiver modules, 9a to 9d, show the output thereof greater than the absolute minimum $V_{min}$, which is the branch "NO" at step S211, the arithmetic unit 11a sets the bias current to the maximum current $I_{bmin}$ and sets the sequence to step S201. On the other hand, one receiver module shows the output thereof less than the absolute minimum $V_{min}$, which is the branch "YES" at step S211, the arithmetic unit 11a asserts the alarm to the outside and sets the bias current $I_b$ to the initial current $I_{b0}$ at step S207. Finally, the sequence returns to step S201 to iterate the monitor of the respective outputs of the receiver modules, 9a to 9d.

Thus, when the optical input level to the SOA 7 decreases, the arithmetic unit 11a increases the bias current $I_b$ such that all receiver modules, 9a to 9d, show the outputs thereof greater than the lower control limit $V_{cmin}$. The optical gain of the SOA 7, as shown in FIG. 6, saturates in a range of a greater bias current. Accordingly, the bias current $I_b$ is controlled so as not to exceed the maximum current $I_{bmax}$. The arithmetic unit 11a sets the bias current $I_b$ to the initial current $I_{b0}$ when one receiver module shows the output thereof less than the absolute minimum $V_{min}$, but this absolute minimum $V_{min}$ may be optionally chosen in respective applications based on the relation between the error rate and the OSNR. The absolute minimum $V_{min}$ is often determined to a value when the error rate becomes greater than $10^{-5}$ under a condition the initial bias current $I_{b0}$ is supplied to the SOA 7. Setting the bias current $I_b$ in the initial current $I_{b0}$, the receiver modules, 9a to 9d, may be escaped from the sudden increase of the optical input to the SOA 7 by, for instance, the insertion or the extraction of the optical connector to the receiver 3. An excessive optical input occasionally breaks down the receiver module.

Under the control sequence for the normal operation, a particular situation possibly occurs, in which one of receiver modules shows the output less than the lower control limit $V_{cmin}$, while, the output of another receiver module for the other wavelengths exceeds the upper control limit $V_{cmax}$. Even in such a condition, the optical receiver 3 may set the bias current $I_b$ to the initial current $I_{b0}$ and assert the alarm to the outside of the receiver. Thus, even the optical signals show different behavior from each other depending of the wavelengths thereof, the optical receiver 3 according to the embodiment described above may escape from the breakdown of the receiver modules by ceasing the control of the optical gain of the SOA.

According to the control algorithm for the optical receiver 3 of the present embodiment, the optical gain of the SOA is adjusted by the magnitude of the bias current supplied thereto by, (1) de-multiplexing the input optical signal depending on the wavelengths, (2) converting the de-multiplexed optical signals to corresponding electrical signals by respective receiver modules, 9a to 9d, (3) monitoring the electrical outputs of the receiver modules, and (4) reflecting the monitored results in the bias current. Thus, the optical receiver may compensate the loss of the optical signal in the transmission medium by a simple arrangement where the monitoring of the input signal is carried out in the downstream of the receiver modules, 9a to 9d, through the electrical signals, which realizes the stable control of the optical gain and the simplified control circuit.

The algorithm of the present invention supplies the bias current $I_b$ so as not to vary the optical gain when all of the receiver modules shows the outputs thereof in the ordinary range from the lower control limit $V_{cmin}$ to the upper control limit $V_{cmax}$, while, to adjust the optical gain when at least one of the receiver modules shows the output out of the ordinary range. Accordingly, even when one of the optical signals in the WDM system attenuates, the optical receiver according to the present invention may stably compensate the attenuation.

The optical receiver of the present invention further controls to set the bias current for the SOA in the initial condition $I_{b0}$ when at least one of the receiver modules, 9a to 9d, shows the output thereof out of the absolute minimum $V_{min}$ or the absolute maximum $V_{max}$. Accordingly, the respective receiver modules may be escaped from the breakdown by the sudden increase of the input optical signal, and from an excessive optical signal after the recover of the optical signal.

FIG. 9 illustrates a block diagram a conventional optical communication system 901, in which the optical receiver 903 has an arrangement different from those shown in FIG. 1 to 5 monitor an optical signal input to the SOA 7 directly from the optical transmission medium 4 by a monitoring unit 910. The bias current of the SOA 7 is controlled based on thus monitored optical signal.

However, this conventional arrangement and method are necessary for the optical receiver 903 to install an optical splitter and an optical monitoring unit 901, which enlarges the size of the optical receiver 903 and the cost thereof. The optical receiver 3 according to the present invention may compact the monitoring unit because of the electrical monitoring arrangement, which also simplifies the optical receiver.

Figure 8:
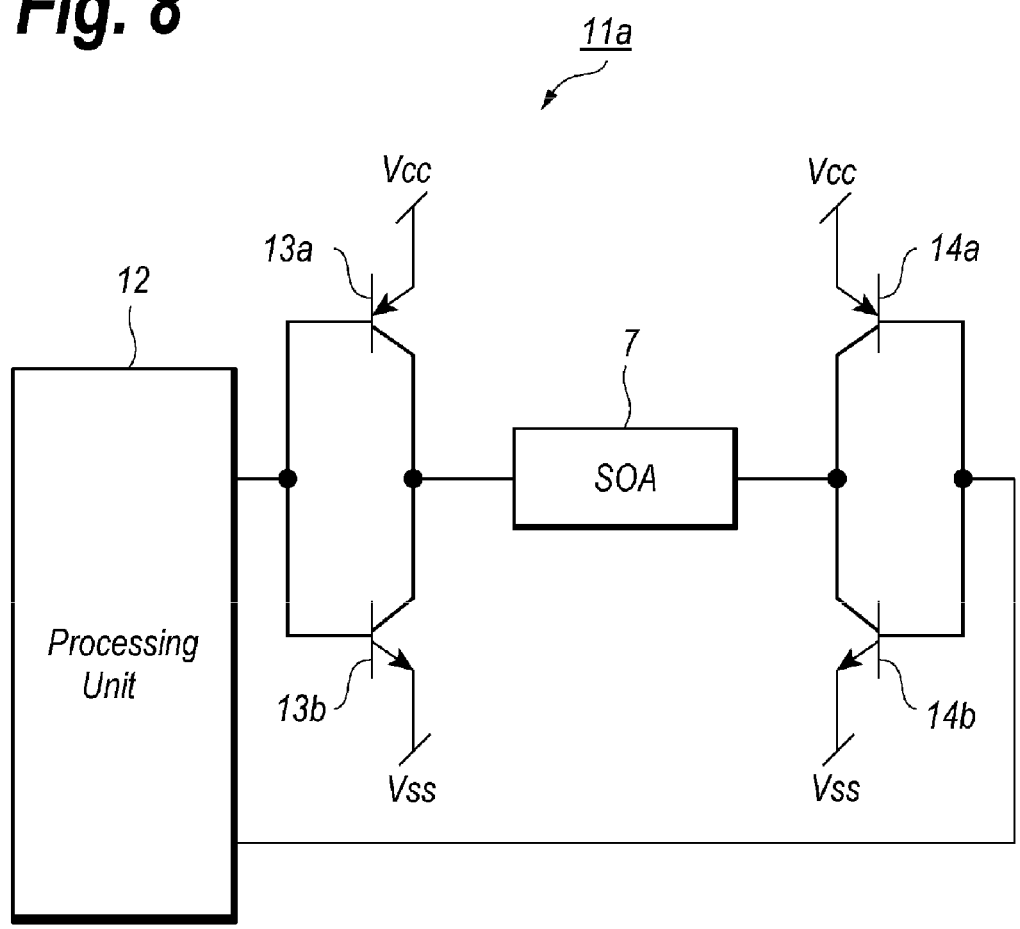
FIG. 8 illustrates another arithmetic unit arranged in the optical receiver shown in FIG. 1.

Although the present invention has been fully described in conjunction with the preferred embodiment thereof with reference to the accompanying drawings, it is to be understood that various changes and modifications may be apparent to those skilled in the art. For example, the arithmetic unit 11a may have an arrangement shown in FIG. 8 where two pairs of the transistors, 13a to 14b, are connected so as to change the direction of the bias current depending on the control signals sent from the processing unit 12. Such changes and modifications are to be understood as included within the scope of the present invention as defined by the appended claims, unless they depart therefrom.

I claim:

1. A method to control an optical receiver that includes a semiconductor optical amplifier in a front end thereof, an optical de-multiplexer, and a plurality of optical receiver modules each receiving one of de-multiplexed optical signal, said method including steps of:
    monitoring electrical signals output from respective optical receiver modules;
    comparing said electrical signals with preset references; and
    controlling a bias current supplied to said semiconductor optical amplifier based on said comparison to adjust an optical gain of said semiconductor optical amplifier.

2. The method of claim 1,
    wherein said step of controlling said bias current includes steps of,
    maintaining said bias current when said electrical signals output from said receiver modules are within a range between a lower control limit and an upper control limit, wherein said lower and upper control limits are said references;
    incrementing said bias current when at least one of said electrical signals is less than said lower control limit and decrementing said bias current when at least one of said electrical signals exceeds said upper control limit; and
    setting said bias current to a minimum current when at least one of said electrical signals output from said receiver modules is greater than said upper control limit but all of said electrical signals is less than an absolute minimum; or to a maximum current when at least one of said electrical signals output from said receiver modules is less than said lower control limit but all of said electrical signals is greater than an absolute minimum.

3. The method of claim 2,
    wherein said step of controlling said bias current further includes a step of,
    setting said bias current to an initial current when one of said electrical signals output from said receiver modules is greater than an absolute maximum or one of said electrical signals is less than an absolute minimum,
    wherein said absolute maximum and said absolute minimum are said references.

4. The method of claim 2,
    wherein said step of controlling said bias current further includes a step of,
    asserting an alarm to an outside of said optical receiver when at least one of said electrical signals output from said receiver modules is greater than said absolute maximum or at least one of said electrical signals is less than said absolute minimum.

5. The method of claim 2,
    wherein said range has a width of 10 dB.

6. The method of claim 1,
    further including a step of, before said step of monitoring electrical signals output from said optical receiver modules,
    setting set bias current to an initial current when said optical receiver starts up.

7. A method to operate an optical receiver applicable to a WDM communication system, in which said optical receiver comprises a semiconductor optical amplifier whose optical gain is able to be varied by adjusting a bias current supplied thereto, an optical de-multiplexer that de-multiplexes input signal light into a plurality of optical signals, and a plurality of receiver modules each receiving one of optical signals, said method comprising steps of:
    monitoring electrical signals each output from said receiver module; and
    setting said bias current to an initial current when at least one of said electrical signals output from said receiver modules is greater than an absolute maximum or less than an absolute minimum, to a minimum current when at least one of said electrical signals is greater than an upper control limit but all of said electrical signals is less than said absolute minimum, or to a maximum current when at least one of said electrical signals output from said receiver modules is less than a lower control limit but all of said electrical signals is greater than said absolute minimum; or leaving said bias current unchanged when all of said electrical signals output from said receiver modules is in a range between said upper control limit and said lower control limit.

8. The method of claim 7, further comprising a step of:
    asserting an alarm to an outside of said optical receiver concurrently with said setting of said bias current to said initial current.

9. The method of claim 7, further comprising a step of:
    setting said bias current to said initial current before said step of monitoring of said electrical signals output from said receiver modules.

10. The method of claim 7,
    wherein said range has a width of 10 dB.

11. An optical receiver installed in a WDM communication system, said comprising:
    a semiconductor optical amplifier set in a front end of said optical receiver, said semiconductor optical amplifier receiving signal light that contains a plurality of optical signals each having a specific wavelength different from each others;
    an optical de-multiplexer that de-multiplexes said signal light received by said semiconductor optical amplifier and amplified thereby into said plurality of said optical signals; and a plurality of optical receiver modules each receiving one of said optical signals and converting said one of optical signals into an electrical signal, wherein semiconductor optical amplifier varies an optical gain thereof by adjusting a bias current supplied thereto depending on said electrical signals output from said optical receiver modules.

12. The optical receiver of claim 11, further comprising a control unit that includes an arithmetic unit for comparing said electrical signals output from said optical receiver modules with references, a memory that stores said references and an interface, wherein said arithmetic unit leaves said bias current unchanged when said electrical signals output from optical receiver modules are in a range between an upper control limit and a lower control limit; sets said bias current to a maximum current when at least one of said electrical signals is less than said lower control limit but all of said electrical signals is less than an absolute maximum, or sets said bias current to a minimum current when at least one of said electrical signals output from said optical receiver modules is greater than said upper control limit but all of said electrical signals is greater than an absolute minimum; or sets said bias current to an initial current when at least one of said electrical signals output from said optical receiver modules is less than said absolute minimum or greater than said absolute maximum.

13. The optical receiver of claim 12, wherein said upper and lower control limits, said absolute maximum, said absolute minimum, said maximum current, said minimum current, and said initial current are stored in said memory.

14. The optical receiver of claim 12, wherein said arithmetic unit sets the bias current to said initial current when said optical receiver is powered on.

* * * * *